United States Patent
Warner et al.

(10) Patent No.: US 8,269,777 B2
(45) Date of Patent: Sep. 18, 2012

(54) METHOD AND SYSTEM FOR SYSTEM VISUALIZATION

(75) Inventors: Michael S. Warner, San Francisco, CA (US); Paul Pantera, Half Moon Bay, CA (US)

(73) Assignee: Presisio Labs, Inc., San Francisco, CA (US)

( * ) Notice: Subject to any disclaimer, the term of this patent is extended or adjusted under 35 U.S.C. 154(b) by 0 days.

(21) Appl. No.: 11/007,671

(22) Filed: Dec. 8, 2004

(65) Prior Publication Data

US 2005/0128201 A1 Jun. 16, 2005

Related U.S. Application Data

(60) Provisional application No. 60/529,052, filed on Dec. 12, 2003.

(51) Int. Cl.
*G06T 13/00* (2011.01)
(52) U.S. Cl. ............ 345/473; 345/419; 345/420
(58) Field of Classification Search .......... 345/474, 345/475, 951, 952
See application file for complete search history.

(56) References Cited

U.S. PATENT DOCUMENTS

| | | | |
|---|---|---|---|
| 5,043,920 A | 8/1991 | Malm et al. | 364/521 |
| 5,072,395 A | 12/1991 | Bliss et al. | 364/443 |
| 5,555,354 A | 9/1996 | Strasnick et al. | 395/127 |
| 5,671,381 A * | 9/1997 | Strasnick et al. | 715/848 |
| 5,729,671 A | 3/1998 | Peterson et al. | 395/123 |
| 5,745,667 A | 4/1998 | Kawase et al. | 395/130 |
| 5,835,085 A * | 11/1998 | Eick et al. | 715/853 |
| 5,945,976 A | 8/1999 | Iwamura et al. | 345/139 |
| 6,005,578 A | 12/1999 | Cole | 345/352 |
| 6,081,278 A * | 6/2000 | Chen | 345/473 |
| 6,204,850 B1 | 3/2001 | Green | 345/357 |
| 6,222,540 B1 * | 4/2001 | Sacerdoti | 345/581 |

(Continued)

OTHER PUBLICATIONS

Demetri Terzopoulos, John Platt, Alan Barr, Kurt Fleischer, "Elastically Deformable Models," Jul. 1987, ACM SIGGRAPH Computer Graphics, vol. 21 No. 4, p. 205-214.*

(Continued)

*Primary Examiner* — Said Broome

(74) *Attorney, Agent, or Firm* — Orrick, Herrington & Sutcliffe LLP

(57) ABSTRACT

In one embodiment, a computer-implemented method comprises receiving a time period indication selected by a user for a group of objects including a plurality of data points. The plurality of data points are mapped to features selected by the user. Key frames are generated for the group of objects for each interval of time of the time period. Relations can be inserted between any pair of objects. The group of objects and relations are rendered using the key frames over the time period to generate an animation. An object position is offset during animation according to an elasticity variable associated with the relations that is selected by the user. Positions in between key frames are interpolated to provide smooth rendering between variable time frames. In an alternate embodiment, the object position is offset during animation according to features of the group of objects selected by the user, with or without the elasticity variable.

48 Claims, 9 Drawing Sheets

U.S. PATENT DOCUMENTS

| | | | |
|---|---|---|---|
| 6,222,557 B1 * | 4/2001 | Pulley et al. | 345/622 |
| 6,326,964 B1 | 12/2001 | Snyder et al. | 345/419 |
| 6,342,886 B1 * | 1/2002 | Pfister et al. | 345/424 |
| 6,510,457 B1 | 1/2003 | Ayukawa et al. | 709/217 |
| 6,532,014 B1 * | 3/2003 | Xu et al. | 345/473 |
| 6,747,650 B2 * | 6/2004 | Turner et al. | 345/473 |
| 6,823,286 B2 | 11/2004 | Yuste et al. | 702/179 |
| 6,823,299 B1 | 11/2004 | Contreras et al. | 703/14 |
| 6,823,379 B1 | 11/2004 | Heckel et al. | 709/224 |
| 6,825,838 B2 | 11/2004 | Smith et al. | 345/419 |
| 6,826,552 B1 | 11/2004 | Grosser et al. | 706/47 |
| 7,027,048 B2 * | 4/2006 | Brombolich | 345/420 |
| 2002/0180739 A1 * | 12/2002 | Reynolds et al. | 345/474 |
| 2003/0011601 A1 * | 1/2003 | Itoh et al. | 345/440 |

OTHER PUBLICATIONS

T. C. Sprenger, M. H. Gross, D. Bielser, and T. Strasser "IVORY—an Object-Oriented Framework for Physics-Based Information Visualization in Java," Oct. 1998, Proceedings IEEE Symposium on Information Visualization, 19-20 p. 79-86, 155.*

Free On-Line Dictionary of Computing/Ontology, Apr. 1997.

Free On-Line Dictionary of Computing/hierarchy, Sep. 2010.

* cited by examiner

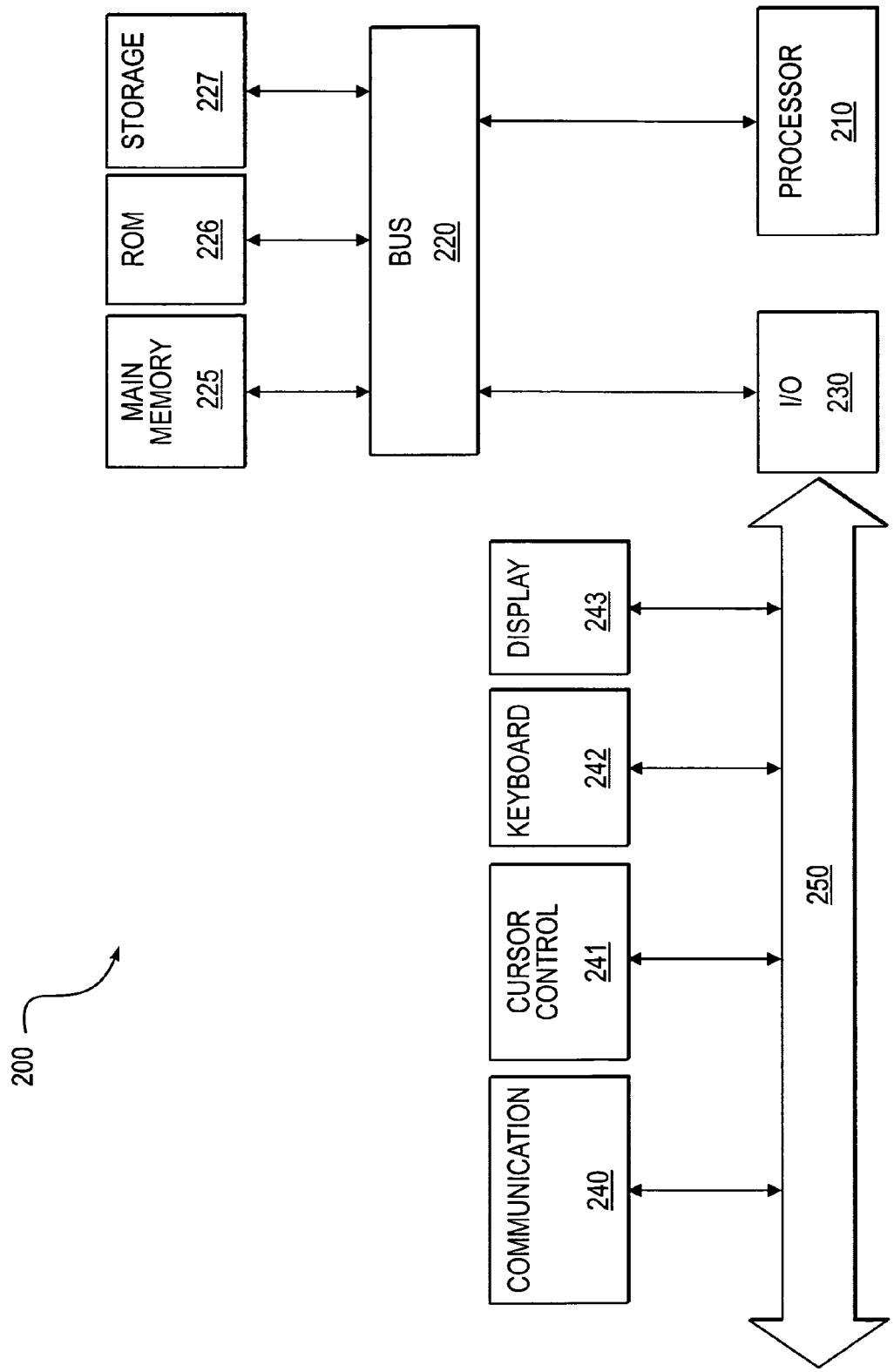

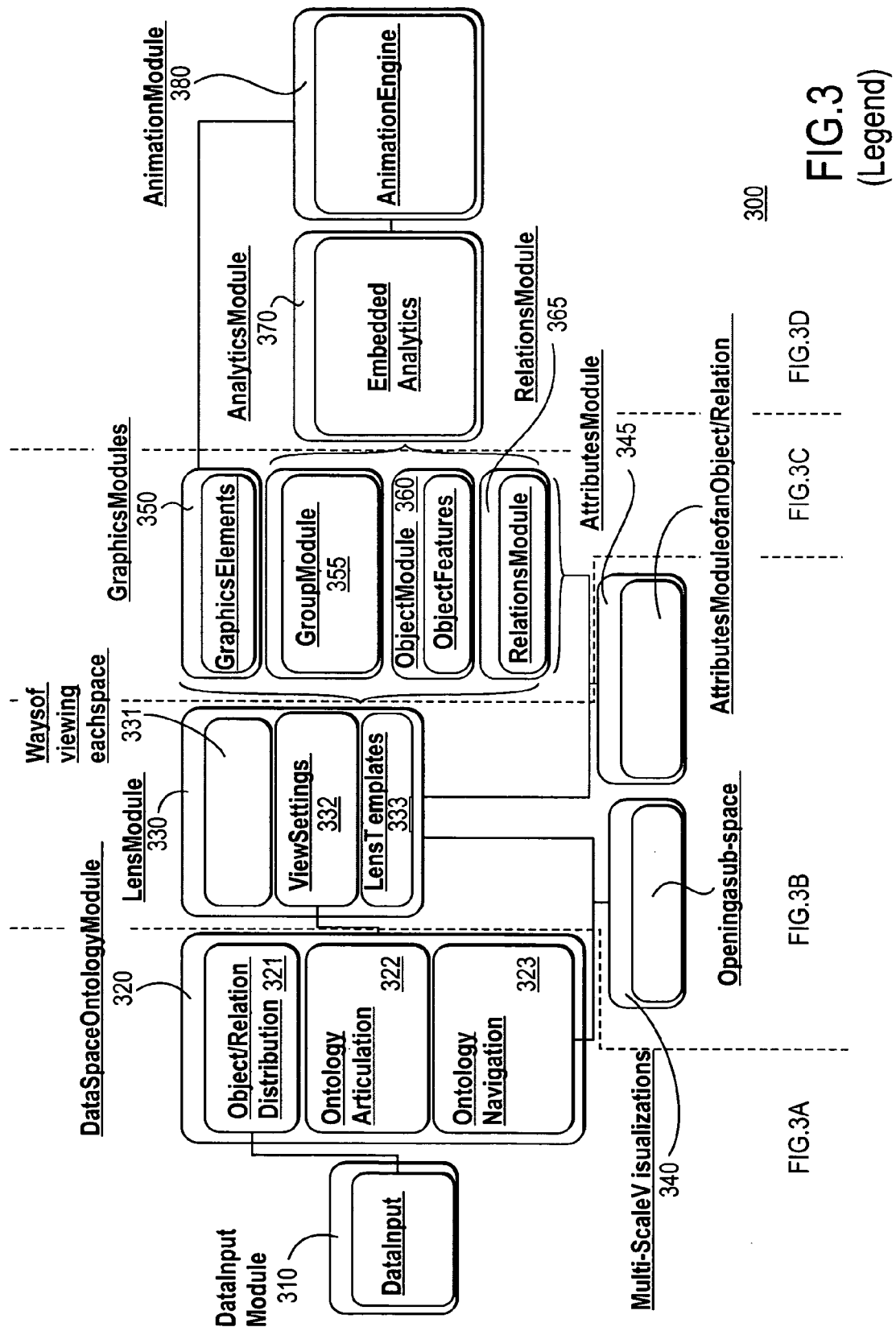

METHOD AND SYSTEM FOR SYSTEM VISUALIZATION

The present application claims the benefit of and priority to U.S. Provisional Patent Application No. 60/529,052 entitled "Universal n-dimensional onto-holotropic space time information utilization," and filed on Dec. 12, 2003, and is hereby, incorporated by reference.

FIELD OF THE INVENTION

The field of the invention relates generally to information display, and more particularly relates to a method and system for system visualization.

BACKGROUND OF THE INVENTION

Systems are being developed for representing information as rendered static three-dimensional (3D) images. One example of such systems relate to financial information. Financial and economic information relating to stock or bond prices and trading activities are presented in a 3D data landscape. Within this data landscape, various rendered 2D or 3D objects (such as blocks, surfaces, etc.) can represent different stocks, bonds or other items of interest and the condition (size, color, position, etc.) of the rendered object represents the present parameters (price, volume, percent change, etc.) of interest for that object.

Such systems, which are often referred to as information visualization systems, have proved to be well suited to representing large amounts of information and/or complex information in an efficient and relatively compact manner. For example, a variety of information, including pricing, size of bids and offers, etc. for the stocks comprising the Standard & Poors 500 can be displayed on a single computer display. Further, as is known, the displays produced within such information visualization systems can often be more readily understood by users than textual or other conventional representations.

It is typically desired by users of such information visualization systems to view the data landscape from more than a single fixed viewpoint and/or distance. Observing the data landscape from a different viewpoint can allow a user to: observe a subset of the objects within the data landscape which are presently of particular interest to the user; identify trends and/or correlations between various of the objects or sets of objects in the data landscape; etc. Similarly, changing the viewing distance ("zooming") allows a user to: choose to observe a single object in detail over a large part of the computer display's screen (e.g.—zoom in on a single object); observe many or all of the objects within the data landscape on the computer display's screen (e.g.—zoom out to a panoramic view of the data landscape); determine the relative size and/or position (when both size and position are mutable variants); or to observe some subset of data landscape.

The user viewpoint within the visualization system is merely the viewpoint to which the 3D representation of the data landscape is rendered. Essentially, the viewpoint can be thought of as the location and orientation of a camera which takes the picture of the data landscape which is being displayed on the computer display. Thus, the rendering engine within the visualization system responds to input from the user to change the desired viewpoint accordingly. When a new viewpoint position and/or distance is input by the user, the rendering engine re-renders the data landscape appropriately, as viewed from the new viewpoint.

When real time, or near-real time rendering is provided, the user can interactively update the viewpoint and observe the result substantially immediately, thus simulating the experience of the user moving with respect to the data landscape. Thus, the user can experience "flying" over or "walking" or "running" through the landscape, as desired.

While the sheer amount of information which can be represented within an information visualization system and the ease with which the representations employed within the landscape allow assimilation of the information by a user are some of the advantages offered by such systems, they can also lead to some difficulties and/or problems. For example, while most users of visualization systems want or require the ability to alter the viewpoint of the data landscape, it is not uncommon that a user becomes "lost" in the rendered image as the viewpoint is moved. This is due to several reasons, including the fact that such landscapes are often quite artificial constructions and there are few, if any, of the real world visual clues normally available to a person. Further, the physical clues (sense of balance and inertia to determine the rate and direction of movement, etc.) which are present in the real world are not provided within visualization systems. Thus, it is possible for a user to, for example, move the viewpoint sufficiently far away (zoom out) from the landscape and to direct the viewpoint away from the data landscape so that the landscape is not in view and the user is ignorant of how to locate the data landscape.

SUMMARY

A method and system for system visualization is disclosed. In one embodiment, a computer-implemented method comprises receiving a time period indication selected by a user for a group of objects including a plurality of data points. The plurality of data points are mapped to features selected by the user. Key frames are generated for the group of objects for each interval of time of the time period. Relations can be inserted between any pair of objects. The group of objects and relations are rendered using the key frames over the time period to generate an animation. An object position is offset during animation according to an elasticity variable associated with the relations that is selected by the user. Positions in between key frames are interpolated to provide smooth rendering between variable time frames. In an alternate embodiment, the object position is offset during animation according to features of the group of objects selected by the user, with or without the elasticity variable.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

FIG. 2 illustrates an exemplary computer architecture, according to one embodiment of the invention;

DETAILED DESCRIPTION

Figure 1:
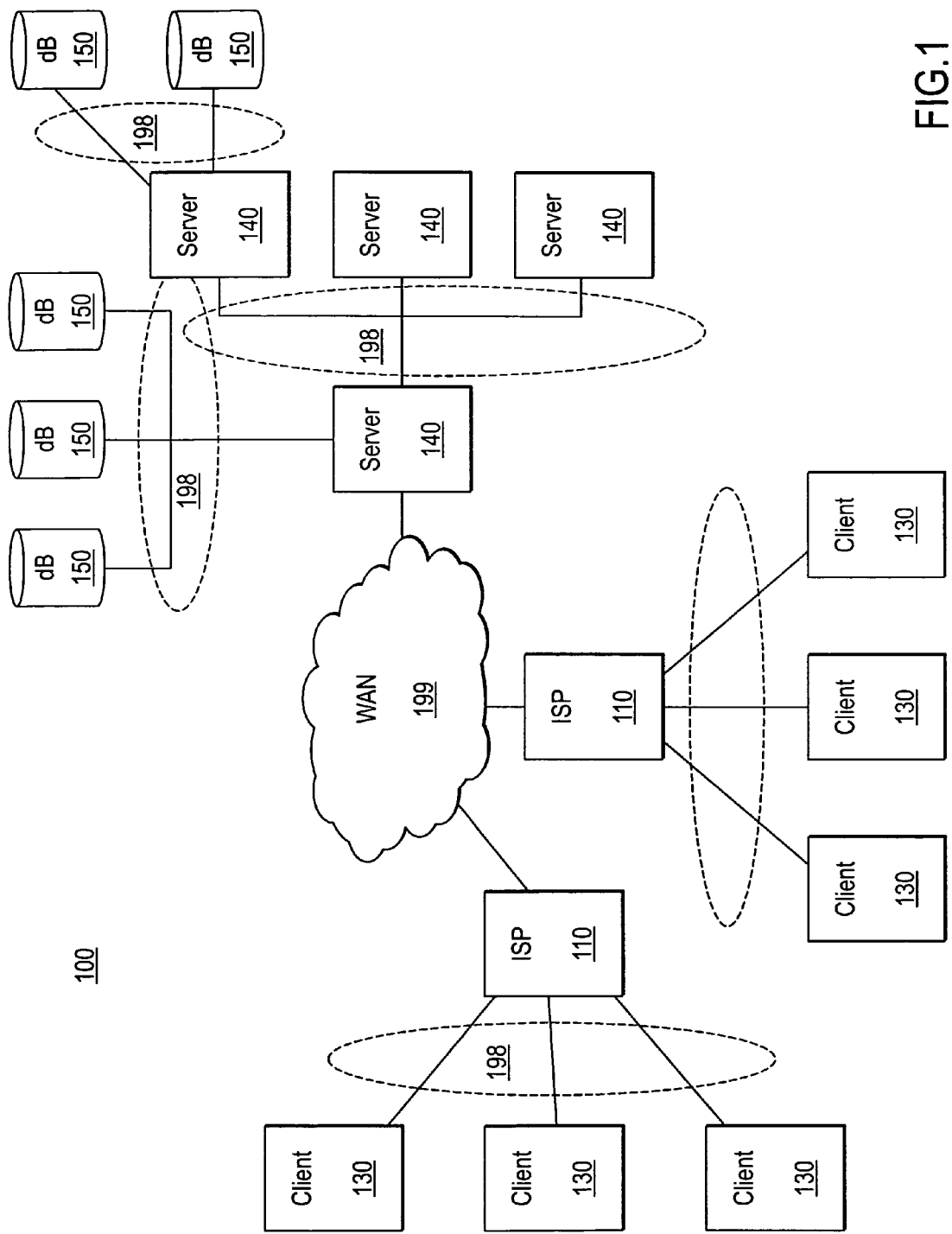
FIG. 1 illustrates a block diagram of an exemplary client server network, according to one embodiment of the present invention.
Figure 3A:
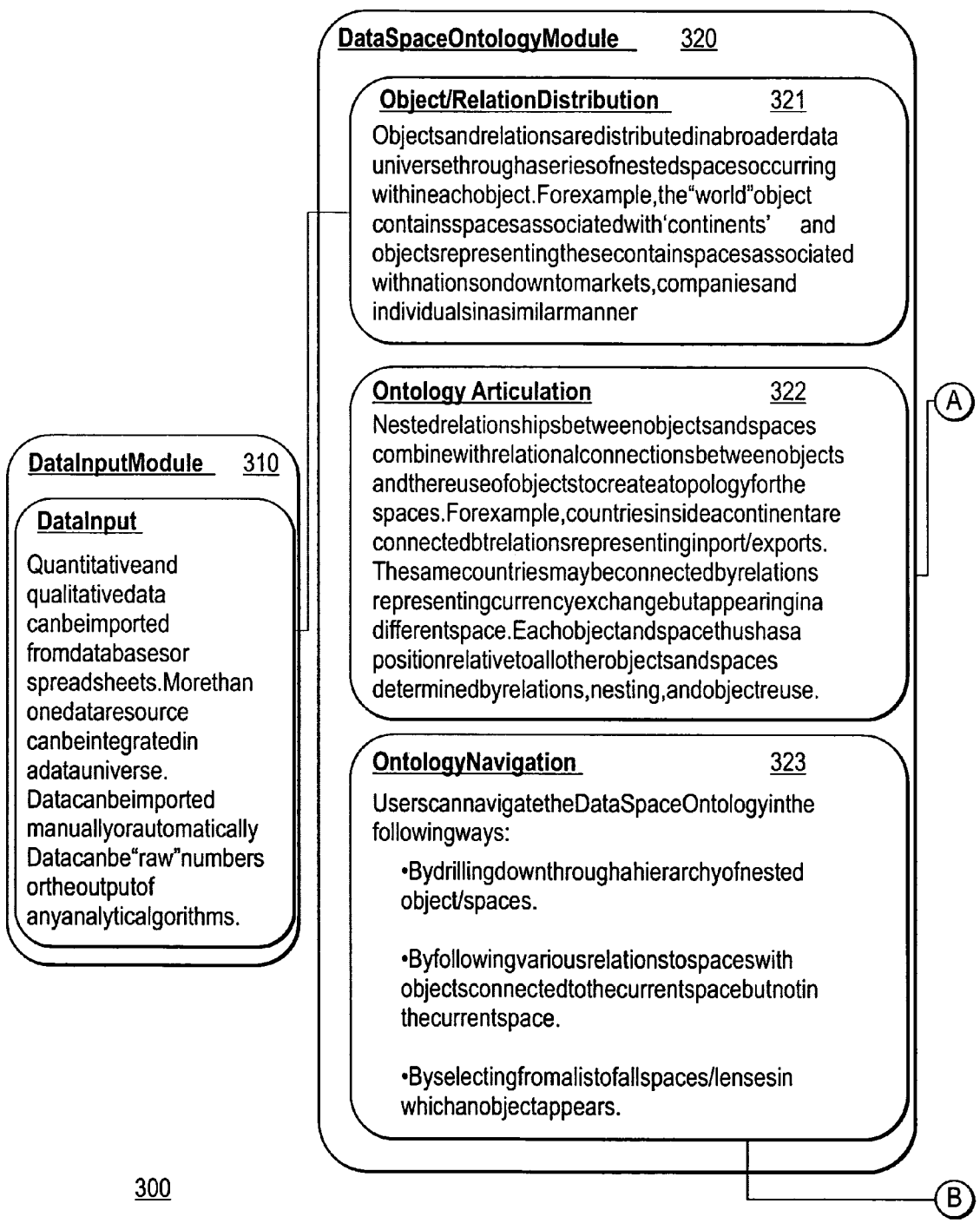
FIG. 3A illustrates a functional block diagram of an exemplary visualization system including data input and data space ontology modules, according to one embodiment of the present invention.
Figure 3B:
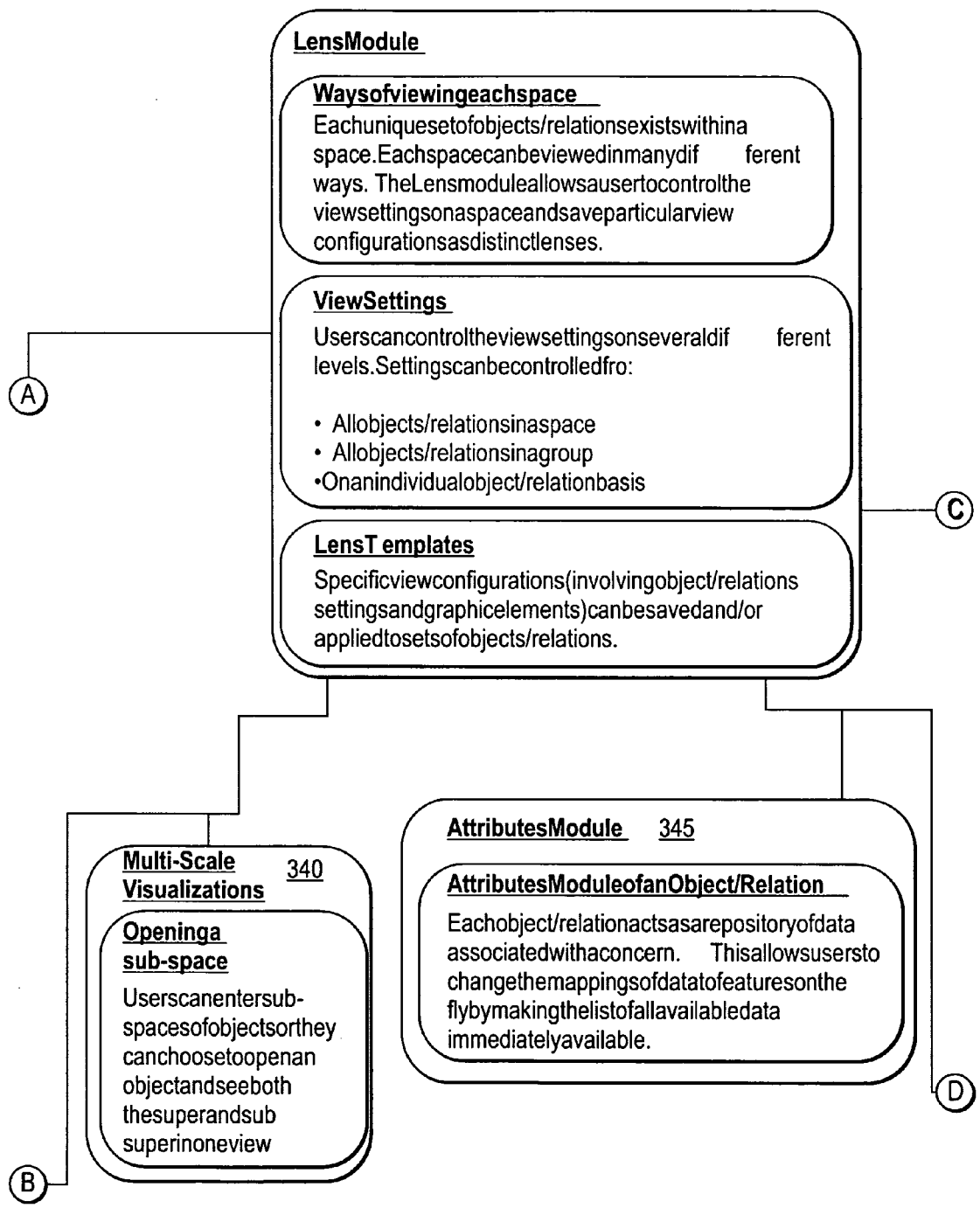
FIG. 3B illustrates a functional block diagram of an exemplary visualization system including lens and attribute modules, according to one embodiment of the present invention.
Figure 3C:
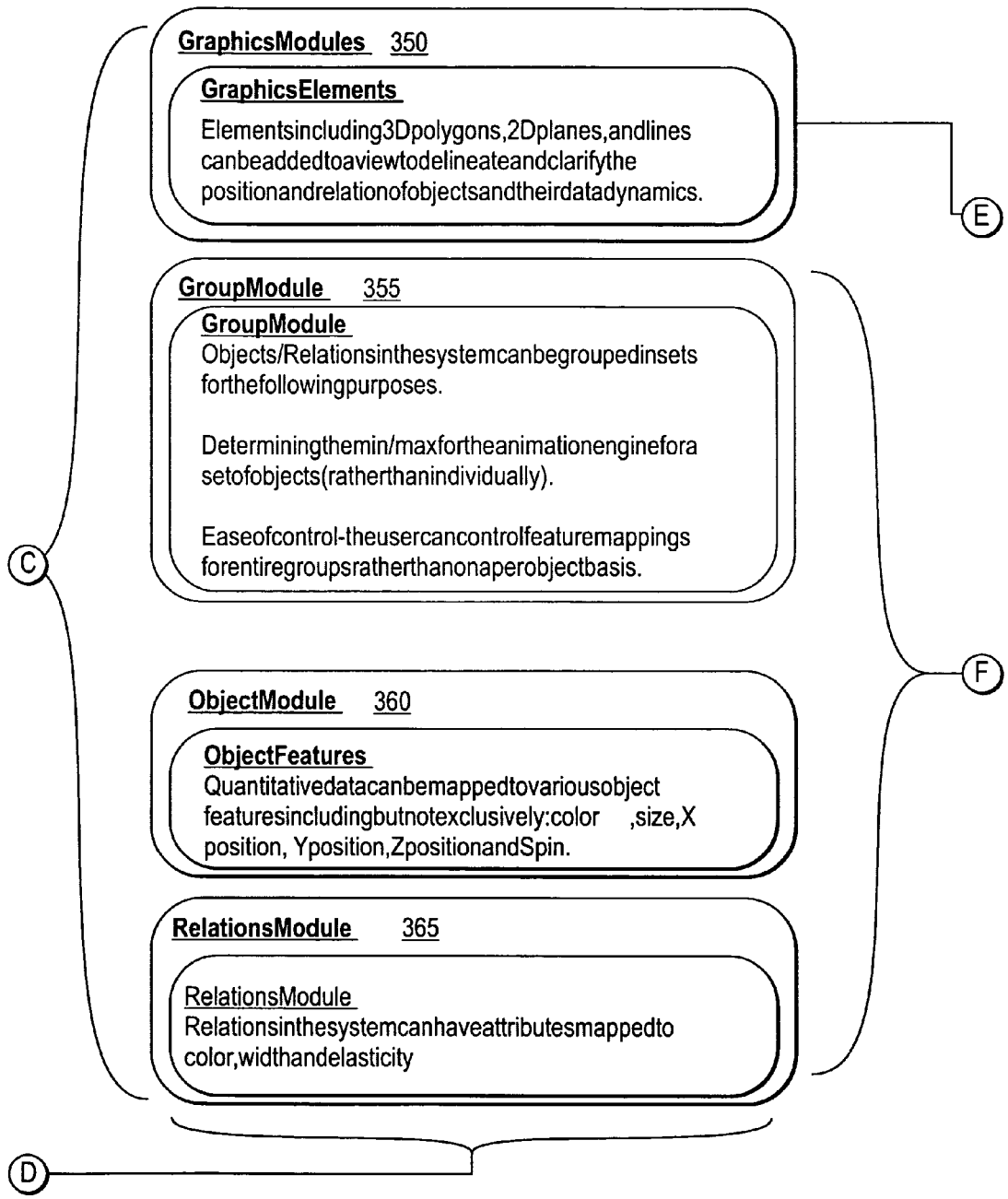
FIG. 3C illustrates a functional block diagram of an exemplary visualization system including graphics, group, object, and relations modules, according to one embodiment of the present invention.
Figure 3D:
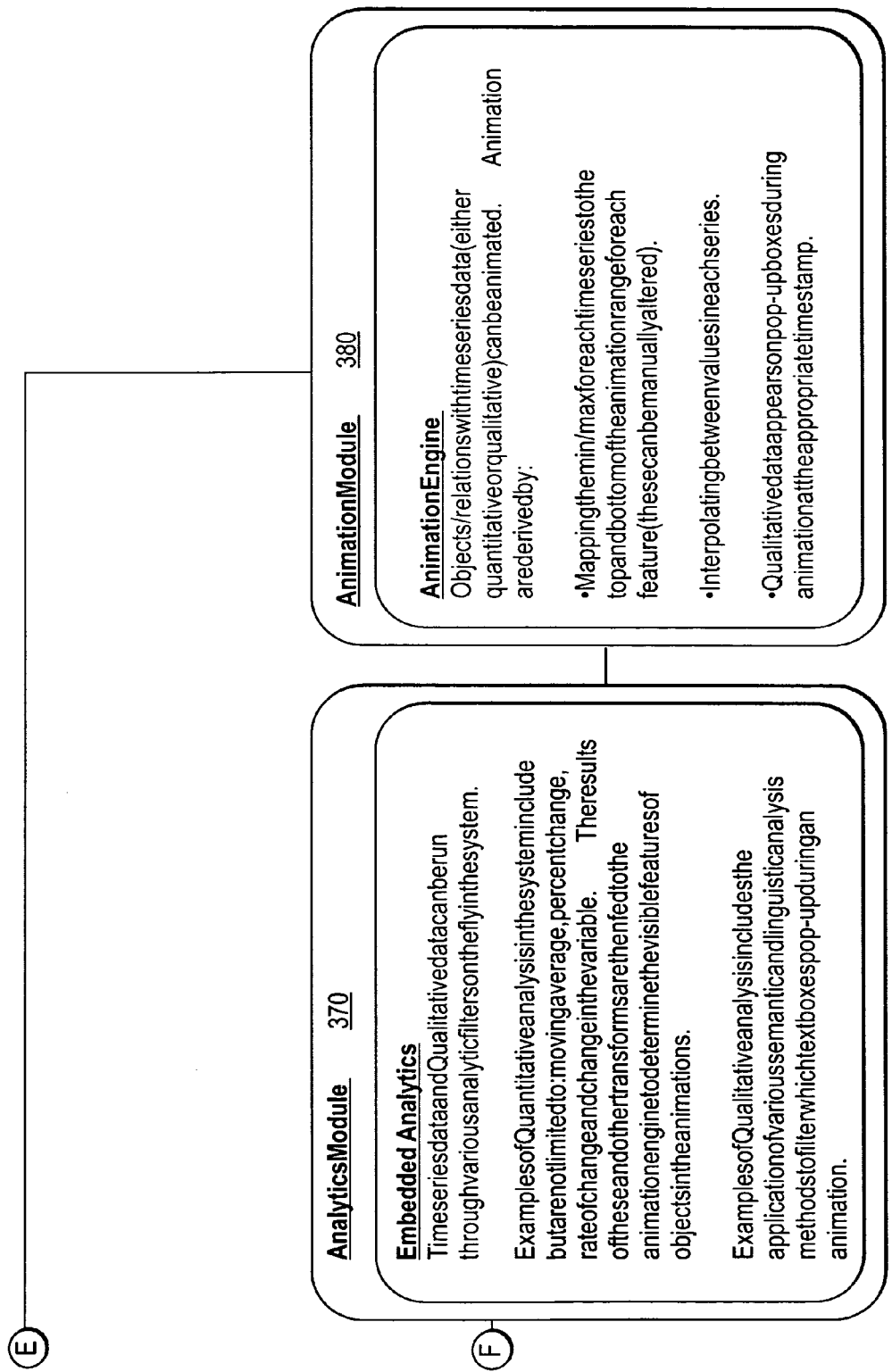
FIG. 3D illustrates a functional block diagram of an exemplary visualization system including analytics and animation modules, according to one embodiment of the present invention.

A method and system for system visualization is disclosed. In one embodiment, a computer-implemented method comprises receiving a time period indication selected by a user for a group of objects including a plurality of data points. The plurality of data points are mapped to features selected by the user. Key frames are generated for the group of objects for each interval of time of the time period. Relations can be inserted between any pair of objects. The group of objects and relations are rendered using the key frames over the time period to generate an animation. An object position is offset during animation according to an elasticity variable associated with the relations that is selected by the user. Positions in between key frames are interpolated to provide smooth rendering between variable time frames. In an alternate embodiment, the object position is offset during animation according to features of the group of objects (mapped object properties) selected by the user, with or without the elasticity variable.

Most contemporary visualization systems focus on the representation of tangible entities such as places or objects in a room. The present method and system allow users to build representational models of abstract entities like stocks, companies, industries, nations, and the dynamics and relationships of their associated data. According to one embodiment of the present invention, the method for system visualization renders a four-dimensional moving image.

The present system is an example of a class of information system expressly designed around a visualization-oriented user-interface. Incorporating more traditional information storage and retrieval technologies into its design, the present system also enables the integrated use of multiple, concurrent visualization techniques to support comparison of content and interrelationship information at several levels of abstraction simultaneously. This approach enables powerful new forms of information analysis easing cognitive workloads by providing a visual context for the information under study. The present system software is intended to support the rapid, concurrent analysis of complex multidimensional information, including structured and unstructured numeric, text, geographic information, and digital imagery. The system combines 3-D visualization techniques that interactively generate accurate visual simulative representations of explicit and implicit relationships contained in information collections of various types.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Turning to the figures, the presently preferred apparatus and methods of the present teachings will now be described. In one embodiment, all elements of the client-server system 100 are interconnected via a network. The network connecting all elements of client-server system 100 may be any wide area network (WAN) 199, or local area network (LAN) 198, or combination of LAN and WAN, generally referred to as the Internet.

In general, the network architecture described herein may be implemented as a standard telephone connection provided through an Internet service provider 110 to enable data communication on the Internet over a conventional telephone network. This use of the Internet as a distribution network is well known to those of ordinary skill in the art. In an alternate embodiment through the use of cable modem technology, communication may be performed over a conventional cable network in lieu of, or in addition to, communication over the telephone network via an ISP 110. In another alternate embodiment, through Integrated Services Digital Network (ISDN) technology, the network is accessed using an ISDN modem, also via an ISP 110. Both clients 130 and servers 140 can access the Internet through the architectures described above.

The clients 130 and servers 140 can be any type of computing device including a personal computer, etc. The workstation 10 may be a SUN ULTRA 60, ULTRA 80, ULTRA 450, BLADE 1000, HPJ6000, IBM RS/6000 F80, DELL WORKSTATION 530, IBM INTELLISTATION ZPRO 6866, or similar computing device.

Typically, databases 150 will comprise a SQL (structured query language) relational database management system (RDBMS) database, such as one of the SQL RDBMS database products provided by ORACLE (ORACLE 81, 91), MICROSOFT (SQL SERVER 7), SYBASE, IBM (DB2) AND INFORMIX. Optionally, the databases 150 may comprise a non-SQL-based server product, such as the MICROSOFT'S ACCESS database or PARADOX.

Having described the hardware architecture of clients 130 and servers 140, a description follows of the operating system and software used to perform the features described herein. Internet browsing is implemented through client computers 130, HTTP server computers 140 and HTTP browsers. Servers 140 play the role of archives for providing data, and client 150 play the role of customers or consumers of the data. Typically many clients connect to a single server. Special server and client software may also be employed, depending on the specific application design architecture.

An Internet browser, such as MICROSOFT'S INTERNET EXPLORER or NETSCAPE'S COMMUNICATOR, is a piece of software which resides on a client computer. When executed by a user, the browser opens a Uniform Resource Locator (URL), which resides on a server 140. Typically, the URL is a Hyper-Text Markup Language (HTML) page, which is sent back from the server 140 to the client 130. The HTML page has instructions for the browser, which instruct the browser how to render the page for display. The page typically has additional URLs embedded in it, and when the user clicks on one of them, the server 140 then sends a new HTML page for the browser to render.

HTML pages can contain both text and graphics, along with layout instructions. Images appearing on an HTML page also reside on the server 140, and are sent to the client 130 when the browser finds a link to an image on the HTML page it is rendering, and then instructs the server 140 to send the image data. The beauty of this is that the images reside on remote computers, and do not have to be stored locally on the client 130. Otherwise, the client would have to store every image it views, either on its hard disk or on a storage medium such as CD-ROM, regularly replacing these images with updates. Both images and data can be stored in databases 150 that are attached to servers 140 directly or through network(s) 198.

Client software, executed on clients 130, can take many forms, such as that of a plug-in for the browser, an Active-X control, a Java applet or a stand alone application. Each form has its relative advantages. For example, plug-ins can be developed full-scale C++ programs, offering a great deal of functionality, but they also require separate installation and are native to a specific platform. Java applets, on the other hand, automatically download from the server and install themselves, triggered by the HTML page, and are cross-platform interoperable, but Java code is more restricted than C++ and performs more slowly.

Similar to client software, server software can also be native to a specific platform or Java. Typically, server software is used for special access to files stored on the server 140, and for extra processing of data before sending it. There is often a trade-off between pre-processing data on the server side, before sending it to the client 130, or having the client 130 process it after the data is received. In extreme cases, an application can be designed with server software doing all of the processing, and no client software at all; or vice versa, client software doing all of the processing, and no server software at all. Again, each choice has its relative advantages. On the one hand, client computers 130 are typically less powerful and have less resources than server computers 140, indicating an advantage to letting the server 140 do the extra processing. On the other hand, servers 140 have to simultaneously handle many clients 130, and any drain on server 140 resources inhibits response time to clients 130, indicating an advantage to letting the client 130 do the extra processing.

The actual data communication between the server and the client is governed by Internet protocols, such as Hyper-Text Transfer Protocol (HTTP) and Internet Imaging Protocol (IIP). These protocols define packets of data to be sent, and can include handshakes for negotiating data-link control, to verify if the data arrived intact. Specifically, the IIP protocol sits as a layer on top of the HTTP protocol, which in turn sits as a layer on top of TCP/IP protocol. Each higher layer is higher level in its functionality; i.e. it deals with more complex data units and communication features. A reference for HTTP is the text "Illustrated Guide to HTTP" by Paul S. Hethmon Copyright 1997 Manning Publications Co., Greenwich, Conn., 1997.

Note that any or all of the components of the system illustrated in FIG. 1 and associated hardware may be used in various embodiments of the present invention; however, it will be appreciated by those of ordinary skill in the art that any configuration of the system may be used for various purposes according to the particular implementation.

FIG. 2 illustrates an exemplary computer architecture 200, according to one embodiment of the invention. Computer architecture 200 can be used to implement both clients 130 and servers 140 of FIG. 1. One embodiment of architecture 200 comprises a system bus 220 for communicating information, and a processor 210 coupled to bus 220 for processing information. Architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, web pages and business related information may be presented to the user on the display device 243.

The communication device 240 permits access to other computers (servers or clients) via a network. The communication device 240 may comprise a modem, a network interface card, a wireless network interface or other well known interface device, such as those used for coupling to Ethernet, token ring, or other types of networks.

Before describing the specific modules that perform the present system visualization method, a general overview of the visualization system is provided. The present visualization system allows a user to collect, organize, manage, navigate, articulate, forecast, share, present and understand a complete multi-scale, multi-relational, multi-natured data field of any system by allowing the user to render parsed or whole views of it as a structure reflective n-dimensional and temporally dynamic simulation.

Users build a complete reflective simulation of any complex ontological structure (i.e., any data structure having inter-related data objects). The resulting digital simulation can include most qualitative or quantitative data. Elements of the present system allow users to organize and access visual objects across and through nested spaces that represent multiple layers of data distributed through a real world reflective model (i.e. global economies, the internet, biological systems and physical properties of matter).

FIG. 3 illustrates a functional block diagram of an exemplary visualization system 300, according to one embodiment of the present invention. System 300 includes numerous modules that allow for the visual expression of inter-system and intra-scalar aspects of topologies and enables the compartmental development of modules and perspectives on groups of elements. The modules of system 300 can reside on a single computer, such as client 130 or server 140, or be distributed throughout multiple clients 130 and/or servers 140.

Data input module 310 allows for quantitative and qualitative data to be imported from databases or spreadsheets. For example, data can be imported from spreadsheets generated by MICROSOFT EXCEL FOR WINDOWS, published by Microsoft Corp. of Redmond, Washington. The imported data can come from numerous sources and is used to populate a data universe. Data can be imported manually or automatically. Data can be 'raw' numbers or according to alternate embodiments, data can be the output of any analytic algorithms.

Data entered into system 300 via data input module 310 is distributed to objects and relations (new and existing). An object acts as a repository for any and all data relating to a particular item within the data universe. Objects are re-usable. This allows users to view lists of distinct ways to view objects. For example, an object represents a real-world entity, like a company, a country, or a department. A relation is a system element that signifies the relationship between two objects. For example, data about Japan's trade with the USA would be associated with a relation between the two objects representing Japan and the USA.

Data space ontology module 320 includes sub-modules for object/relation distribution, ontology articulation, and ontology navigation. According to one embodiment, ontology refers to the hierarchical structure of nested objects and spaces in the data universe. As will be discussed below in greater detail, the data universe consists of numerous spaces containing groups of objects, and the objects contain spaces having additional groups of objects, thus creating a hierarchy. The use of lenses in system 300 allow users to save and use multiple distinct ways of viewing a set of objects and/or relations.

Object/relation distribution sub-module 321 allows objects and relations to be distributed within the data universe through a series of spaces occurring within each object. For example, a 'world' object contains spaces associated with 'continents' and objects representing these contain spaces associated with nations on down to markets, companies and individuals in a similar manner.

Ontology articulation sub-module 322 allows the creation of a topology for a space. More particularly, nested relationships between objects and spaces combine with relational connections between objects and the reuse of objects to create a topology for the spaces. For example, countries inside a continent are connected by relations representing import/exports. The same countries may be connected by relations representing currency exchange but appearing in a different space. Each object and space thus has a position relative to all other objects and spaces determined by relations, nesting, and object reuse.

Ontology navigation sub-module 323 allows users of system 300 to navigate the data universe in the following ways:

By drilling down through a hierarchy of nested objects and spaces;

By following various relations into spaces with objects connected to the current space but not in the current space; and By selecting from a list of all spaces/lenses in which an object appears.

Data space ontology module 320 interacts with lens module 330 that determines how a space is displayed. A space must have at least one lens associated with it, and may have several, each being a different method of visualizing the set of objects contained within. The lens module 330 includes sub-modules for controlling the ways of viewing each space 331, view settings 332, and lens templates 332. Sub-module 331 allows a user to define a set of feature settings and mappings to generate different views. The lens module 331 allows a user to control the view settings on a space and save particular view configurations as distinct lenses.

View settings sub-module 332 allows users to control the view settings on several different levels. Settings can be controlled for:

All objects/relations in a space;

All objects/relations in a group; and

On an individual object/relation basis.

A group is a set of objects or relations, usually having similar attributes. Attributes are a named list of datapoints. Objects may have any number of attributes associated with them. Examples would be gross national product (GNP), sales, income, or profit. Each attribute is a list of dates and values, relating to any property of an object. Mappings are associated with groups. For example, a group of country objects might have GNP mapped to Y, which would apply the mapping of Y to GNP on all members of the group. Other settings are also associated with group, including a 3 dimensional (3D) model used to display the objects.

Lens templates sub-module 333 provides specific view configurations (involving object/relation settings and graphic elements) that can be saved and/or applied to sets of objects/relations. Lens module 330 communicates with data space ontology module 320 (described above), multi-scale visualizations module 340, attribute module 345, graphics module 350, group module 355, object module 360, and relations module 365.

Multi-scale visualizations module 340 allows users to open a sub-space, or a portion of a 3D space. Users can enter sub-spaces of objects or they can choose to open an object and see both super and sub-spaces in one view. When viewed as sub-spaces within a super-space, objects and relations within that sub-space are rendered to scale within the parent object and maintain their position within the parent object if it moves. Multi-scale visualizations module 340 communicates with lens module 330 and data space ontology module 320.

Attribute module 345 allows for attributes of an object or relationship to be stored. Each object/relation acts as a repository of data associated with a concern. This allows users to change the mappings of data to features on the fly by making the list of all available data immediately available. Attribute module 345 communicates with lens module 330, graphics module 350, group module 355, object module 360 and relations module 365.

Graphics module 350 provides graphic elements for use in system 300. Graphic elements include 3D polygons, 2D planes, and lines. The graphic elements can be added to a view to delineate and clarify the position and relation of objects and their data dynamics. Graphics module 350 communicates with lens module 330, attribute module 345, and animation module 380.

Group module 355 allows objects/relations in the system to be grouped in sets for several reasons. One reason is to determine the minimum and maximum for a set of objects provided to the animation engine, rather than individually. Another reason is for ease of control, such that the user can control feature mappings for entire groups rather than on a per object basis. Group module 355 communicates with lens module 330, attribute module 345, and analytics module 370.

Object module 360 relates to features of objects. For example, quantitative data can be mapped to various object features including: color, size, X position, Y position, Z position, spin, and other similar features. Object module 360 communicates with lens module 330, attribute module 345, and analytics module 370.

Relations module 365 allows relations in system 300 to have attributes mapped to color, width and elasticity. Relations module 365 communicates with lens module 330, attribute module 345, and analytics module 370.

Analytics module 370 operates to provide embedded analytics. More particularly, time series data and qualitative data can be run through various analytic filters on the fly in system 300. Examples of quantitative analysis in system 300 include: moving average, percent change, rate of change, change in the variable, and other similar analytics. The results of these and other transforms are then fed to the animation module 380 to determine the visible features of objects in the animations. Examples of qualitative analysis include the application of various semantic and linguistic analysis methods to filter which text boxes pop-up during an animation. Analytics module 370 communicates with group module 355, object module 360, relations module 365, and animation module 380.

Animation module 380 includes an animation engine. Objects/relations with time series data (either quantitative or qualitative) can be animated. Animations are derived by mapping the minimum and maximum for each time series to the top and bottom of an animation range for each feature (these can be manually altered). The animation engine in animation module 380 interpolates between values in each series. Additionally, animation module 380 presents qualitative data in pop-up boxes while rendering the animation at an appropriate time stamp.

Figure 4:
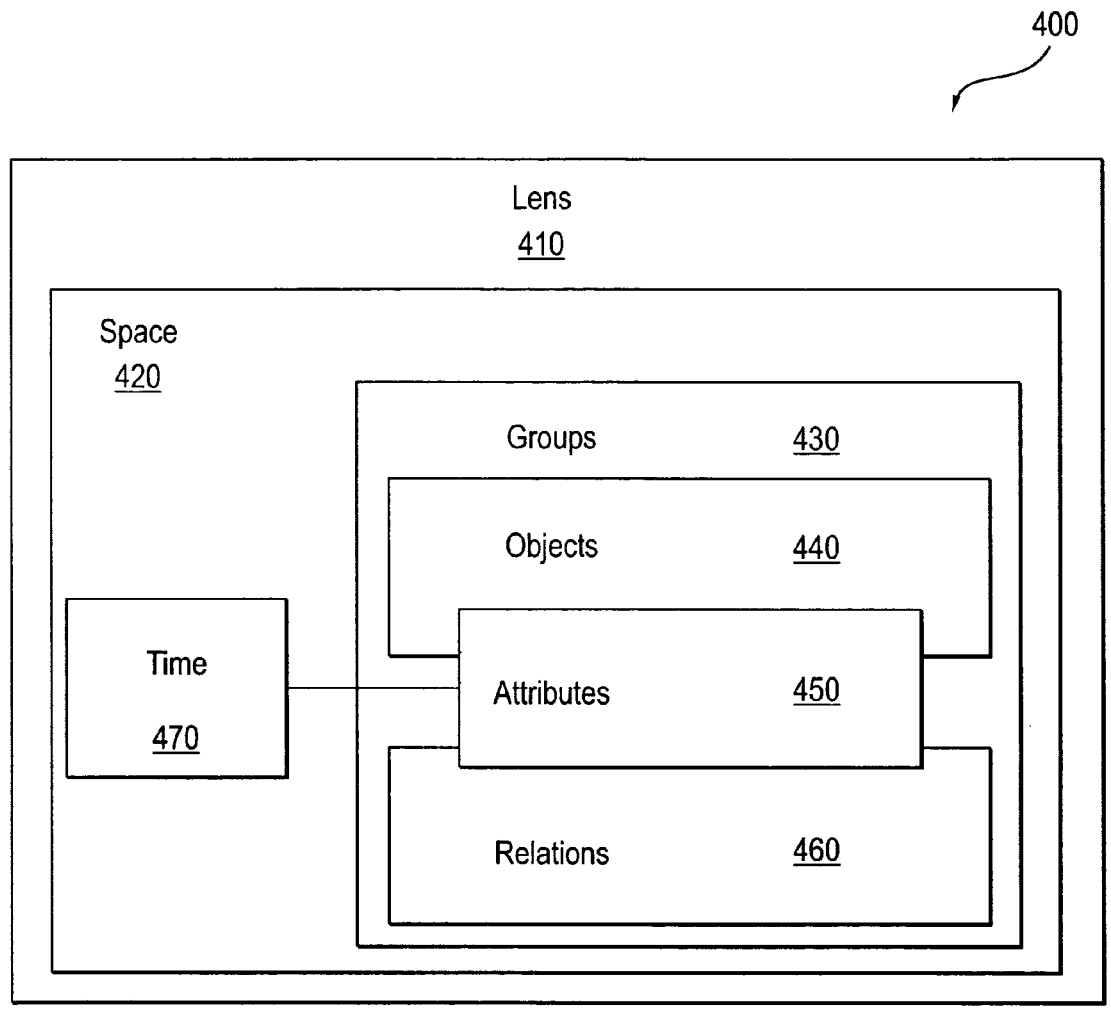
FIG. 4 illustrates a block diagram of exemplary utilities of a visualization system, according to one embodiment of the present invention.

FIG. 4 illustrates a block diagram of exemplary utilities 400 of a visualization system 300, according to one embodiment of the present invention. The system 300 described above enables the utilization of the following utilities of system 300: lens 410, spaces 420, groups 430, objects 440, relations 460, attributes 450, and time 470. Descriptions of these seven utilities follow:

Lens 410 is a utility that allow the articulation of perspectives on a concern and it's environment. The lens contains a set of feature settings and mappings that determine how a space and its contents are displayed. Each space has at least one lens associated with it, and may have several, each being a different method of visualizing the content contained within. For example, a space containing objects representing countries can have a lens where each countries' GDP is mapped to it's Y axis position.

Space 420 provides a utility to associate the 3D spatial and n-dimensional ontological position and expression of data properties. A space 420 is a 3D area containing one or more groups of objects or relations. Each space 420 has a position within a broader space which is determined by it's data relations to the parent object of those spaces. This position is manifested as a nesting of spaces inside objects and the ability to navigate spaces per 1) their occurrence in other space 420/lenses 410 and 2) per their relations and groups with other objects. A user can navigate both hierarchically and (due to the reuse of objects signifying a particular thing) horizontally via the occurrence of objects in other lenses 410/spaces 420.

Groups 430 is a utility that is associated with the definition and management of sets of entities objects and relations. Objects and relations in a group usually have similar attributes. Mappings which determine variable properties of objects and relations can be determined on the group level. For example, a group of country objects might have GNP mapped to Y, which would apply the mapping of Y to GNP on all members of the group 430. Other settings also associated with groups 430, include the 3D model used to display the objects and the system used for determining the position. Individual object/relation settings or lens settings can override a group's setting.

Objects 440 are utilities associated with the articulated expression of models representing entities in space 420. For example, an object can be a country, industry, company or individual. Objects have features which are used to convey attribute values by either through the static comparison of multiple object feature expression or the variable change of those feature expressions over time. Example features include: position in a Cartesian X,Y,Z space, radius, color, spin. Objects can be opened to reveal spaces inside of it in the current space.

Relations 460 are utilities that allow for the articulated expression of relations between objects in space. Relations 460 share color and radius (width) features in common with objects, but also have unique features like elastic strength (a push or pull between objects). Data may be associated with relations 460 just as it can be associated with objects. For example, data about trade between Japan and USA would be associated with a relation between the two objects representing Japan and USA. Taken together, relations 460 between objects creates a lattice which provides a means of navigating the broader space by invoking objects that are related to one in the currently viewed space into it or moving to another lens that contains it. Relations 460 can occur across levels of nested spaces (i.e. a relation between a country and company inside another country).

Attributes 450 are utilities for managing any quantitative or qualitative information associated with a object or relation. An attribute can be a named list of data points with observation/time stamps or a text field. Examples for a country would include: GDP, population (quantitative) and a description of it's history (qualitative).

Time 470 is a utility associated with the articulation and expression of temporal dynamics of data. A user can select a timeframe and chose to animate a time series. Features mapped to attributes on objects and relations then express their variability. Qualitative attributes that have specific time stamps can be made to appear at specific times during the animation.

Entities about which data has been gathered are represented visually as objects. Data about the relationship between two objects is placed on a relation that visually connects the two objects. The position, size, and color of the objects are determined by the associated data in a user-defined way.

The system 300 has the notion of a current time, or a time period selected by the user. The data being visualized for all objects on the display screen is determined by the data describing the object at the current time, or particular interval of time under analysis. The user may animate the current time, causing the objects' position, color, and size to change accordingly. The user, therefore, sees an animation where the movement of objects is determined by the data associated with them. The human brain excels at finding patterns and correlations in moving objects, and the present system helps the user find patterns and correlations in the data associated with a given set of entities.

The data associated with relations can be used to affect the color and width of the relation connecting the two associated objects. In addition, the data can be made to pull the objects closer to each other with a varying degree of strength, creating clustering between closely related objects. Patterns and correlations in the relationships can be easily discovered by watching the varying pushing and pulling of the relations during an animation.

A given object may have an arbitrary number of attributes about which data has been gathered. These attributes are comprised of a list of dates and associated values, although in alternate embodiments additional information is provided. The system 300 analyzes the set of data points in a given group of nodes to determine the maxima and minima. Using this information, it can map the data to features chosen by the user, such as position, radius, and color. In terms of radius, the lowest data value corresponds to the smallest object, and the highest data value corresponds to the largest object. Other objects are sized somewhere within this range, according to their data values at the current time interval.

When the user chooses to animate the current time period, a set of key frames is constructed. Each key frame contains a position, size, and color for each object. Each key frame corresponds to a different point in time; one key frame is constructed for each unique point in time for which a data value is know for any object in the scene. Once the key frames are constructed, the system animates through them using standard real-time 3D graphics animation techniques. Relations' positions, widths, and colors are inserted into the key frames in a similar manner, and then the objects' positions are offset due to the pulling strength of the attached relations.

An iterative technique is used to offset the objects' positions. The amount of pull is affected by a global elasticity variable that is chosen by the user. The amount of pull is determined such that the maximum attribute value with the maximum elasticity will result in the two objects pulling each other so that they are both at the same position. Using this algorithm, all relations are iterated an arbitrary number of times and offset the position of the two associated objects by $1/n$ the amount of the total pull, where n is a variable. According to one embodiment, n equals 30. This allows for a single object to be pulled by multiple relations at the same time. The elastic force (e.g., elastic strength or elasticity) along with position determinates assigned to the object determine it's motion during animation.

According to one embodiment, the elasticity function affected by the user selected elasticity variable performs as follows. The strength of the interval in a particular key frame is normalized, for example, between $-1$ and $+1$. The strength is then multiplied by the user selected elasticity variable and scaled to fall between $-0.5$ and $+0.5$. Thus, two objects are pulled toward each other by this fraction of the distance between them. So if the strength is 0.5 (the max), one object is pulled 50% of the distance toward the other, and the other is pulled 50% of the distance toward the first, and they are both at the same position. Instead of moving the objects the whole distance at once, the objects are moved $1/30$th of the way each time through a loop, 30 times. This allows for objects to be realistically pulled in multiple directions at once.

Combining these techniques with a navigation mechanism (lens 410) the user is able to unfold articulated expressions of data within a broader information reflective environment. It is possible for a user to model the entire dynamic field of forces and factors affecting a topic.

The description of the system above provides a universal n-dimensional onto-holotropic space-time information utilization system. The present system is universal in that it can apply to any and all domains of space-time information. The present system is n-dimensional in that it allows a user to see multiple qualitative and quantitative dimensions of a concern simultaneously. The present system is onto-holotropic in that it allows a user to navigate an interconnected lattice of ways to view a concern: 'ontic' refers to the shared conceptual architecture surrounding a concern; 'holotropic' is a composite word meaning 'turning towards the whole.' The present system presents the user with an ability to build and efficiently navigate a complete representation of visualizing a concern. The system can express any qualitative and quantitative information domain of concerns in space-time.

Figure 5:
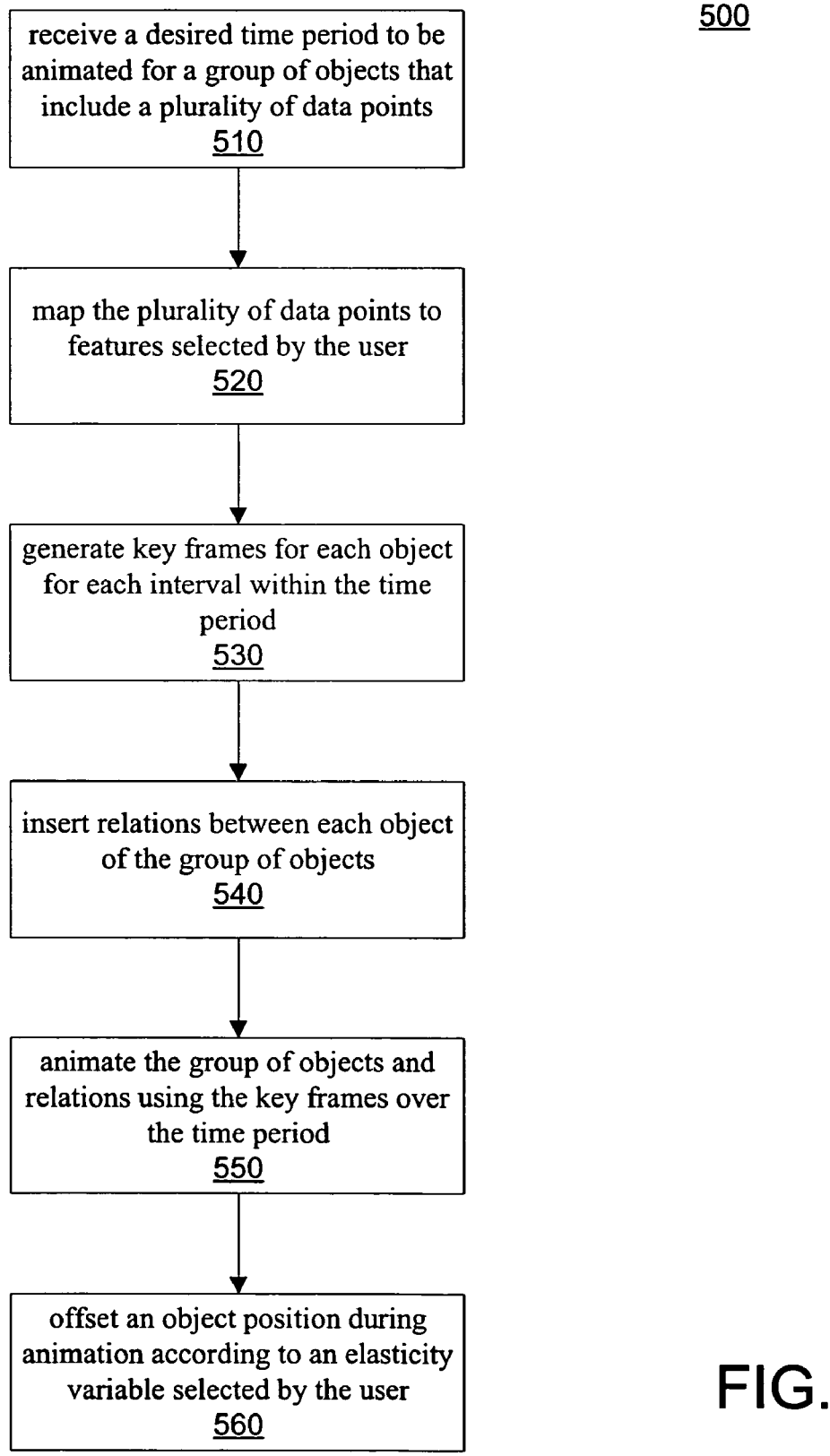
FIG. 5 illustrates a flow diagram of an exemplary process for multi-dimensional visualization of objects, according to one embodiment of the present invention.

FIG. 5 illustrates a flow diagram of an exemplary process 500 for multi-dimensional visualization of objects, according to one embodiment of the present invention. A user provides a time period that selects a group of objects including a plurality of data points that the user wants to visualize. (block 510) The plurality of data points are mapped to features selected by the user, such as the group's radius, position and color. (block 520) Key frames are generated for each object of the group of objects for each interval of the time period. (block 530) Relations are inserted to connect each object of the group of objects. (block 540) The group of objects and relations are animated by using the key frames over the time period. (block 550) An object's position is offset during the animation according to an elasticity variable selected by the user. (block 560)

It is important to note that the method and system described above operates in real-time (up to the most recently available time) to render animated visualizations of real data. The data can be received in real-time and processed by the system in real-time, as well.

A method and system for system visualization is disclosed. Although the optimized interface has been described with respect to specific examples and subsystems, it will be apparent to those of ordinary skill in the art that it is not limited to these specific examples or subsystems but extends to other embodiments as well.

We claim:

1. A computer-implemented method, comprising:
   modeling a system with ontological spaces;
   receiving a time period indication selected by a user for a first group of objects and a second group of objects, the first group of objects and the second group of objects including a plurality of data points;
   mapping the plurality of data points to features selected by a user defined template;
   generating key frames for the first group of objects and the second group of objects for each interval of time of the time period;
   inserting first relations between each object of the first group of objects, the first group of objects including a re-used object;
   inserting second relations between each object of the second group of objects, the second group of objects including the re-used object;
   animating the first group of objects and first relations using the key frames over the time period to generate an animation;
   generating a lattice-type relationship that interconnects the first relations and the second relations;
   offsetting an object position during animation according to an elasticity variable selected by the user, the elasticity variable affecting an animated attraction of a first object having the object position and a second object; and
   displaying the animation on a computer display according to the user defined template having a view configuration.

2. The computer-implemented method of claim 1, further comprising:
   analyzing the first group of objects to determine a maximum data point and a minimum data point; and
   mapping a lowest data point to a smallest object and a largest data point to a largest object.

3. The computer-implemented method of claim 1, wherein the object position is also offset during animation according to features of the first group of objects selected by the user.

4. The computer-implemented method of claim 3, further comprising moving a relation position during animation based upon the elasticity variable.

5. The computer-implemented method of claim 4, wherein animating the first group of objects comprises iterating through all relations and objects of the first group of objects.

6. The computer-implemented method of claim 5, wherein the time period indication is associated with real world information that is tracked over time.

7. The computer-implemented method of claim 6, wherein the features include group position, group radius, and group color.

8. The computer-implemented method of claim 7, wherein the relations include relation widths, relation positions, and relation colors.

9. The computer-implemented method of claim 8, wherein the key frames include object position, object size, and object color for each object of the first group of objects.

10. The computer-implemented method of claim 9, further comprising displaying the animation on the computer display from a remote server.

11. The computer-implemented method of claim 1, wherein the relations and each object are rendered to scale within a parent object and maintain their position within the parent object if the parent object moves.

12. The computer-implemented method of claim 1, wherein positions in between key frames are interpolated to provide smooth rendering between each time period.

13. A system, comprising:
   means for modeling a system with ontological spaces;
   means for receiving a time period indication selected by a user for a first group of objects and a second group of objects, the first group of objects and the second group of objects including a plurality of data points;
   means for mapping the plurality of data points to features selected by a user defined template;
   means for generating key frames for the first group of objects and the second group of objects for each interval of time of the time period;
   means for inserting first relations between each object of the first group of objects, the first group of objects including a re-used object;
   means for inserting second relations between each object of the second group of objects, the second group of objects including the re-used object;
   means for animating the first group of objects and first relations using the key frames over the time period to generate an animation;
   means for generating a lattice-type relationship that interconnects the first relations and the second relations;
   means for offsetting an object position during animation according to an elasticity variable selected by the user, the elasticity variable affecting an animated attraction of a first object having the object position and a second object; and; and
   displaying the animation on a computer display according to the user defined template having a view configuration.

14. The system of claim 13, further comprising
   means for analyzing the first group of objects to determine a maximum data point and a minimum data point; and
   means for mapping a lowest data point to a smallest object and a largest data point to a largest object.

15. The system of claim 13, wherein the object position is also offset during animation according to features of the first group of objects selected by the user.

16. The system of claim 15, further comprising means for moving a relation position during animation based upon the elasticity variable.

17. The system of claim 16, wherein the means for animating the group of objects comprises means for iterating through all relations and objects of the first group of objects.

18. The system of claim 17, wherein the time period indication is associated with real world information that is tracked over time.

19. The system of claim 18, wherein the features include group position, group radius, and group color.

20. The system of claim 19, wherein the relations include relation widths, relation positions, and relation colors.

21. The system of claim 20, wherein the key frames include object position, object size, and object color for each object of the first group of objects.

22. The system of claim 21, further comprising means for displaying the animation on the computer display from a remote server.

23. The system of claim 13, wherein the relations and each object are rendered to scale within a parent object and maintain their position within the parent object if the parent object moves.

24. The system of claim 13, wherein positions in between key frames are interpolated to provide smooth rendering between each time period.

25. A non-transitory computer-readable medium having stored thereon a plurality of instructions, said plurality of instructions when executed by a computer, cause said computer to perform:
modeling a system with ontological spaces;
receiving a time period indication selected by a user for a first group of objects and a second group of objects, the first group of objects and the second group of objects including a plurality of data points;
mapping the plurality of data points to features selected by a user defined template;
generating key frames for the first group of objects and the second group of objects for each interval of time of the time period;
inserting first relations between each object of the first group of objects, the first group of objects including a re-used object;
inserting second relations between each object of the second group of objects, the second group of objects including the re-used object;
animating the first group of objects and first relations using the key frames over the time period to generate an animation;
generating a lattice-type relationship that interconnects the first relations and the second relations;
offsetting an object position during animation according to an elasticity variable selected by the user, the elasticity variable affecting an animated attraction of a first object having the object position and a second object; and
displaying the animation on a computer display according to the user defined template having a view configuration.

26. The non-transitory computer-readable medium of claim 25, having stored thereon additional instructions, said additional instructions when executed by a computer, cause said computer to further perform:
analyzing the first group of objects to determine a maximum data point and a minimum data point; and
mapping a lowest data point to a smallest object and a largest data point to a largest object.

27. The non-transitory computer-readable medium of claim 25, wherein the object position is also offset during animation according to features of the first group of objects selected by the user.

28. The non-transitory computer-readable medium of claim 27, having stored thereon additional instructions, said additional instructions when executed by a computer, cause said computer to further perform moving a relation position during animation based upon the elasticity variable.

29. The non-transitory computer-readable medium of claim 28, wherein animating the first group of objects comprises iterating through all relations and objects of the first group of objects.

30. The non-transitory computer-readable medium of claim 29, wherein the time period indication is associated with real world information that is tracked over time.

31. The non-transitory computer-readable medium of claim 30, wherein the features include group position, group radius, and group color.

32. The non-transitory computer-readable medium of claim 31, wherein the relations include relation widths, relation positions, and relation colors.

33. The non-transitory computer-readable medium of claim 32, wherein the key frames include object position, object size, and object color for each object of the group of objects.

34. The non-transitory computer-readable medium of claim 33, further comprising having stored thereon additional instructions, said additional instructions when executed by a computer, cause said computer to further perform displaying the animation on the computer display from a remote server.

35. The non-transitory computer-readable medium of claim 25, wherein the relations and each object are rendered to scale within a parent object and maintain their position within the parent object if the parent object moves.

36. The non-transitory computer-readable medium of claim 25, wherein positions in between key frames are interpolated to provide smooth rendering between each time period.

37. A system, comprising:
a processor;
a memory device storing instructions to be executed by the processor;
a display; and
a bus connecting the processor, and memory device; wherein the processor executes instructions provided from the memory device to,
model a system with ontological spaces;
receive a time period indication selected by a user for a first group of objects and a second group of objects, the first group of objects and the second group of objects including a plurality of data points;
map the plurality of data points to features selected by a user defined template;
generate key frames for the first group of objects and the second group of objects for each interval of time of the time period;
insert first relations between each object of the first group of objects, the first group of objects including a re-used object;
insert second relations between each object of the second group of objects, the second group of objects including the re-used object;
animate the first group of objects and first relations using the key frames over the time period to generate an animation according to the user defined template having a view configuration;
generate a lattice-type relationship that interconnects the first relations and the second relations; and
offset an object position during animation according to an elasticity variable selected by the user, the elasticity variable affecting an animated attraction of a first object having the object position and a second object.

38. The system of claim 37, wherein the processor executes instructions to:
analyze the first group of objects to determine a maximum data point and a minimum data point; and
map a lowest data point to a smallest object and a largest data point to a largest object.

39. The system of claim 37, wherein the object position is also offset during animation according to features of the first group of objects selected by the user.

40. The system of claim 39, wherein the processor executes instructions to move a relation position during animation based upon the elasticity variable.

41. The system of claim 40, wherein the processor executes instructions to iterate through all relations and objects of the group of objects.

42. The system of claim 41, wherein the time period indication is associated with real world information that is tracked over time.

43. The system of claim 42, wherein the features include group position, group radius, and group color.

44. The system of claim 43, wherein the relations include relation widths, relation positions, and relation colors.

45. The system of claim 44, wherein the key frames include object position, object size, and object color for each object of the group of objects.

46. The system of claim 45, the processor executes instructions to display the animation on the computer display from a remote server.

47. The system of claim 37, wherein the relations and each object is rendered to scale within a parent object and maintains its position within the parent object if the parent object moves.

48. The system of claim 37, wherein positions in between key frames are interpolated to provide smooth rendering between each time period.

* * * * *

UNITED STATES PATENT AND TRADEMARK OFFICE
CERTIFICATE OF CORRECTION

| | | |
|---|---|---|
| PATENT NO. | : 8,269,777 B2 | Page 1 of 1 |
| APPLICATION NO. | : 11/007671 | |
| DATED | : September 18, 2012 | |
| INVENTOR(S) | : Michael S. Warner and Paul Pantera | |

It is certified that error appears in the above-identified patent and that said Letters Patent is hereby corrected as shown below:

Title Page Item (73) Assignee: Please change from "Presisio Labs, Inc." to -- Presidio Labs, Inc. --.

Signed and Sealed this
Thirtieth Day of October, 2012

David J. Kappos
*Director of the United States Patent and Trademark Office*